US012811128B2

(12) United States Patent
Shimura et al.

(10) Patent No.: US 12,811,128 B2
(45) Date of Patent: Nov. 24, 2026

(54) ELECTRODE MANUFACTURING METHOD

(71) Applicant: TOYOTA JIDOSHA KABUSHIKI KAISHA, Toyota (JP)

(72) Inventors: Yosuke Shimura, Toyota (JP); Tomoya Mesuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 420 days.

(21) Appl. No.: 18/617,833

(22) Filed: Mar. 27, 2024

(65) Prior Publication Data

US 2025/0046777 A1 Feb. 6, 2025

(30) Foreign Application Priority Data

Jul. 31, 2023 (JP) ................................ 2023-124410

(51) Int. Cl.
*H01M 4/04* (2006.01)

(52) U.S. Cl.
CPC ....... *H01M 4/0404* (2013.01); *H01M 4/0471* (2013.01)

(58) Field of Classification Search
CPC .......... B05D 3/0413; B05D 3/06; B05D 7/24; H01M 4/139; H01M 4/13; H01M 4/0404; H01M 4/0471; Y02E 60/10
See application file for complete search history.

(56) References Cited

U.S. PATENT DOCUMENTS

2020/0343532 A1* 10/2020 Aya ....................... H01M 4/131
2023/0207771 A1* 6/2023 Kwack ................ H01M 4/0404 427/542

FOREIGN PATENT DOCUMENTS

CN 110819951 B * 4/2023 ............ C23C 14/34
JP 2007-227831 A 9/2007
JP 2013-084383 A 5/2013
JP 2015230852 A * 12/2015
JP 2023-531013 A 7/2023
KR 20070041824 A * 4/2007 ............. H01M 4/70
WO WO-2014136813 A1 * 9/2014 .......... H01M 50/489

OTHER PUBLICATIONS

CN110819951 MT (Year: 2010).*
JP2015230852 MT (Year: 2015).*
JPO decision to grant a Patent for JP 2023124410 (Year: 2025).*
KR20070041824 MT (Year: 2007).*

* cited by examiner

*Primary Examiner* — Alexander Usyatinsky
(74) *Attorney, Agent, or Firm* — SoraIP, Inc.

(57) ABSTRACT

An electrode manufacturing method includes an application step of obtaining a coating film by coating a slurry obtained by dispersing an electrode material on a current collecting foil in a solvent to obtain a coating film, and a drying step of drying the coating film while transporting the current collecting foil from which the coating film is formed in the drying furnace interior, wherein the drying step irradiates at least one heat source to the coating film, the irradiation range of the heat source irradiated to the coating film has two regions divided by a straight line that divides the length in the transport direction of the irradiation range into two equal parts, and the ratio of the energy density of the heat source irradiated to the upstream region to the energy density of the heat source irradiated to the downstream region is 1.2 or more and 3.0 or less.

4 Claims, 4 Drawing Sheets

ELECTRODE MANUFACTURING METHOD

CROSS-REFERENCE TO RELATED APPLICATION

This application claims priority to Japanese Patent Application No. 2023-124410 filed on Jul. 31, 2023, incorporated herein by reference in its entirety.

BACKGROUND

1. Technical Field

The present application relates to an electrode manufacturing method.

2. Description of Related Art

Hitherto, there has been known an electrode manufacturing method in which a slurry obtained by dispersing an electrode material in a solvent is applied onto a current collector foil to obtain a coating film and then the coating film is dried in a drying furnace to obtain an electrode.

For example, Japanese Unexamined Patent Application Publication No. 2013-084383 (JP 2013-084383 A) discloses an electrode manufacturing method in which a slurry for forming an electrode mixture layer is applied to a web-shaped current collector foil and then a coating film is dried by blowing hot air to the coating film while feeding the current collector foil to which the slurry is applied in one direction in a drying furnace.

SUMMARY

In the drying step, the coating film is irradiated with a heat source (laser or hot air), but the solvent evaporation rate on a downstream side in a transport direction in an irradiation range of the heat source is higher than the solvent evaporation rate on an upstream side. This causes a problem that the manufactured electrode is cracked.

Therefore, a main object of the present disclosure is to provide an electrode manufacturing method that can suppress cracking of an electrode.

The present disclosure provides at least the following aspects.

An electrode manufacturing method according to one aspect of the present disclosure includes:

an application step for applying, onto a current collector foil, a slurry obtained by dispersing an electrode material in a solvent to obtain a coating film; and a drying step for drying the coating film while transporting the current collector foil with the coating film in a drying furnace.

In the drying step, the coating film is irradiated with a heat source at least once.

Assuming that an irradiation range of the heat source that irradiates the coating film includes two regions divided by a straight line bisecting a length of the irradiation range in a transport direction, the region located on an upstream side in the transport direction is an upstream region, and the region located on a downstream side in the transport direction is a downstream region, a ratio of an energy density of the heat source that irradiates the upstream region to an energy density of the heat source that irradiates the downstream region is 1.2 or more and 3.0 or less.

In the electrode manufacturing method, in the drying step, the heat source may be a laser and hot air.

In the electrode manufacturing method, the hot air may include upstream hot air that is blown to the upstream region and downstream hot air that is blown to the downstream region, and an air velocity of the upstream hot air may be higher than an air velocity of the downstream hot air.

Another aspect of the present disclosure provides a battery manufacturing method. The battery manufacturing method includes:

an electrode manufacturing step for manufacturing an electrode by the electrode manufacturing method described above; and a battery manufacturing step for assembling a battery by using the electrode.

With the electrode manufacturing method of the present disclosure, cracking of the electrode can be suppressed. With the battery manufacturing method of the present disclosure, a decrease in battery performance due to cracking of the electrode can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Electrode Manufacturing Method

Figure 1:
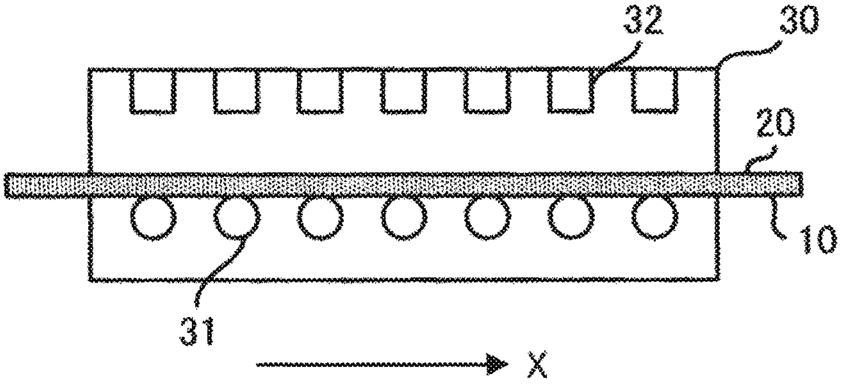
FIG. 1 is a cross-sectional view of a drying furnace 30 taken along a transport direction X of a current collector foil 10.

An electrode manufacturing method of the present disclosure will be described using an embodiment.

An electrode manufacturing method according to an embodiment includes an application step of coating a slurry obtained by dispersing an electrode material in a solvent on a current collector foil 10 to obtain a coating film 20, and a drying step of drying the coating film 20 while transporting the current collector foil 10 on which the coating film 20 is formed in a drying furnace 30.

Application Step

The application step is a step of coating a slurry obtained by dispersing an electrode material in a solvent on the current collector foil 10 to obtain a coating film 20. Such application steps are known. A typical example will be described below, but the application step is not limited to this form.

The current collector foil 10 is not particularly limited as long as it is a sheet-like conductive member. For example, the current collector foil 10 may be a metal foil made of a metal such as stainless steel, copper, aluminum, titanium, or nickel. The metal foil may be made of an alloy containing two or more of these metals. The metal foil may be subjected to a surface treatment such as plating. The current collector foil 10 may be made of two or more metal foils. In this case, the metal foil may be bonded by an adhesive or the like, or may be bonded by a press or the like.

The electrode material includes at least an active material. The active material is a positive electrode active material or a negative electrode active material. The positive electrode active material is not particularly limited, and may be appropriately selected from known materials according to the desired battery performance. Examples thereof include composite oxides, metallic lithium, and sulfur. Compositions of the composite oxide include, for example, at least one of iron, manganese, titanium, nickel, cobalt, and aluminum, and lithium. Exemplary complex oxides include olivine-type lithium ferric phosphate ($LiFePO_4$). The negative electrode active material is not particularly limited, and may be appropriately selected from known materials depending on the desired battery performance. Examples thereof include carbon such as graphite, artificial graphite, highly oriented graphite, mesocarbon microbeads, hard carbon, and soft carbon, a metal compound, an element alloyable with lithium or a compound thereof, and boron-added carbon. Examples of elements that can be alloyed with lithium include silicon and tin.

When the electrode material includes a positive electrode active material, the electrode finally obtained becomes a positive electrode. Conversely, if the electrode material comprises a negative electrode material, the resulting electrode will be a negative electrode.

The electrode material may optionally include a conductive aid. The conductive auxiliary agent is not particularly limited, and may be appropriately selected from known materials depending on the desired battery performance. Examples thereof include acetylene black, carbon black, and graphite.

The electrode material may optionally comprise a binder. The binder is not particularly limited, and may be appropriately selected from known materials depending on the desired battery performance. Examples thereof include fluorine-containing resins such as polyvinylidene fluoride, polytetrafluoroethylene, and fluorine rubber, thermoplastic resins such as polypropylene and polyethylene, imide resins such as polyimide and polyamideimide, alkoxysilyl group-containing resins, acrylic resins such as poly(meth)acrylic acid, alginates such as styrene-butadiene rubber (SBR), carboxymethylcellulose, sodium alginate, and ammonium alginate, water-soluble cellulose ester crosslinked products, and starch-acrylic acid graft polymers.

The electrode material may optionally comprise a solid electrolyte. The solid electrolyte is not particularly limited, and may be appropriately selected from known materials depending on the desired battery performance. Examples thereof include an oxide solid electrolyte and a sulfide solid electrolyte.

The solvent is not particularly limited as long as the electrode material can be appropriately dispersed. Examples thereof include water and an organic solvent. Examples of the organic solvent include N-methyl-2-pyrrolidone, dimethylformamide, dimethylacetamide, methanol, acetone, methyl ethyl ketone, methyl isobutyl ketone, cyclohexanone, methyl acetate, ethyl acetate, and tetrahydrofuran. One of these solvents may be used alone, or two or more of them may be used in combination.

The coating method is not particularly limited as long as the slurry can be applied to the current collector foil 10 in a thin film form. For example, the slurry can be applied to the current collector foil 10 at any thickness using a known coating apparatus.

Drying Step

The drying step is a step of drying the coating film 20 while transporting the current collector foil 10 on which the coating film 20 is formed inside the drying furnace 30. An electrode is obtained by a drying step. FIG. 1 is a schematic diagram illustrating a drying step. FIG. 1 is a cross-sectional view of a drying furnace 30 taken along a transport direction X of a current collector foil 10.

As shown in FIG. 1, the current collector foil 10 on which the coating film 20 is formed is transported by using a plurality of transport rollers 31 installed inside the drying furnace 30. At this time, the coating film 20 is dried by the heat source device 32 installed on the top of the coating film 20. The plurality of heat source devices 32 are typically disposed along the transport direction of the current collector foil 10. The transportation rate is not particularly limited, but is, for example, a 1 to 10 m/second.

The heat source device 32 is a device that irradiates the coating film 20 with a heat source. In FIG. 1, since the plurality of heat source devices 32 are installed in the drying furnace 30, the coating film 20 is irradiated with the heat source a plurality of times. However, the number of the heat source devices 32 may be appropriately changed according to the purpose, and may be at least one. That is, in the drying step, the coating film 20 may be irradiated with the heat source at least once.

Figure 2:
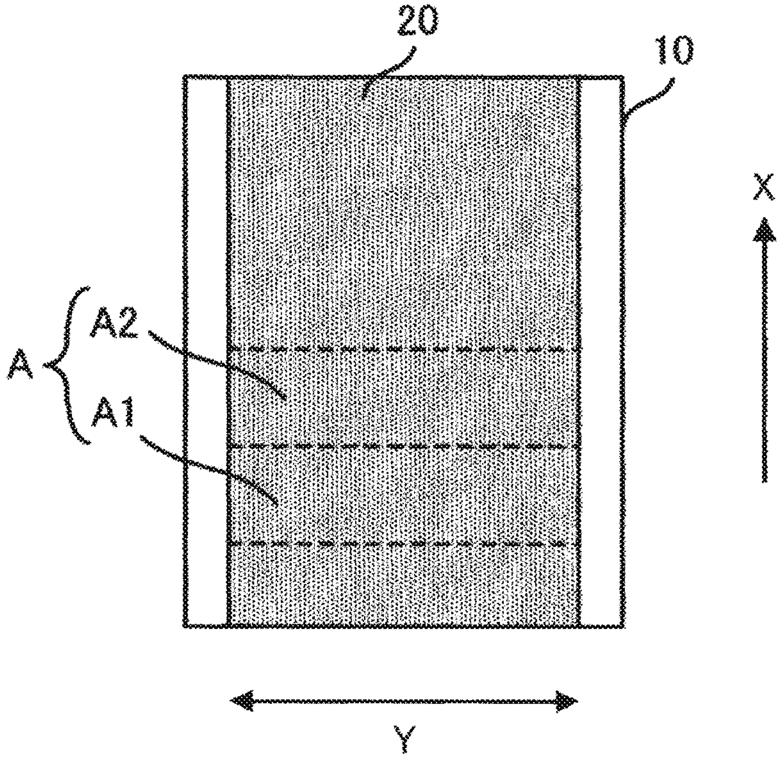
FIG. 2 is a diagram illustrating an irradiation range A of a heat source irradiated to the coating film 20.

Here, the irradiation range of the heat source irradiated from the heat source device 32 to the coating film 20 will be described. FIG. 2 is a diagram illustrating the irradiation range A. As shown in FIG. 2, the irradiation range A has two regions divided by a straight line that equally divides the length of the irradiation range A in the transportation direction X by two. A region disposed upstream of the transportation direction X is referred to as an upstream region A1. A region disposed downstream of the transportation direction X is referred to as a downstream region A2.

Then, the energy density E1 (E1/E2) of the heat source irradiated on the upstream region A1 with respect to the energy density E2 of the heat source irradiated on the downstream region A2 is 1.2 or more and 3.0 or less. As a result, cracking of the obtained electrode can be suppressed. From the viewpoint of more effectiveness, E1/E2 may be 1.5 or more and 2.0 or less. If E1/E2 is less than 1.2, the coating film 20 may be heated in the downstream-region A2 (i.e., the solvent-evaporation rate may be increased), and thus the cracking may not be suppressed. If E1/E2 exceeds 3.0, the coating film 20 may be heated at the upstream region A1 (the rate of evaporating the solvents becomes faster), and thus the cracking of the electrodes may not be suppressed.

The reason why E1/E2 is set to a predetermined area as described above will be described. In the irradiation region A of the heat source, the temperature of the coating film 20 is higher in the downstream region A2 than in the upstream region A1 when both the upstream region A1 and the downstream region A2 are irradiated with the heat source having the same energy-density. This is because the radiation duration of the heat source is longer in the coating film 20 on the downstream region A2 than in the coating film 20 on the upstream region A1. The evaporation rate of the solvent in the coating film 20 increases as the temperature of the coating film 20 increases. If the evaporation rate of the solvent is too high, cracks and cracks are likely to occur in the electrodes. Therefore, cracks are likely to occur in the coating film 20 (the electrode to be manufactured) in the higher-temperature downstream region A2.

Therefore, in the drying step of the embodiment, the energy density of the heat source irradiated to the upstream region A1 is set to be larger than the energy density of the heat source irradiated to the downstream region A2. The evaporation rate of the solvent in the upstream region A1 was increased, and the evaporation rate of the solvent in the downstream region A2 was decreased. Thus, cracking of the electrode can be suppressed.

The length of the irradiation range A in the width direction Y is not particularly limited, but is usually set to be the same as the width direction length of the coating film 20. The length of the irradiation range A in the transport direction X is not particularly limited and varies depending on the configuration of the heat source device 32. For example, 100 mm or more and 2000 mm or less.

The energy-density E1 of the heat source irradiated to the upstream region A1 is, for example, 1 or more and 5 or less. The energy-density E2 of the heat source applied to the downstream region A2 is, for example, 0.33 or more and 4.2 or less.

The heat source irradiated from the heat source device 32 is a laser or hot air. From the viewpoint of setting the energy-density E1, E2 differently, the heat source is usually a combination of a plurality of heat sources. Examples include (1) a heat source including two lasers having different energy densities, and (2) a heat source combining a laser and hot air.

Examples of the laser include a fiber laser, a direct laser, and a VCSFL laser. The laser may be a laser having a high focusing property. Further, the irradiation frequency of the laser may be pulse irradiation or continuous irradiation with respect to the transport direction. Since the laser has a higher energy density than that of hot air, it has an advantage of being able to impart a higher energy density to the coating film 20.

The temperature of the hot air is not particularly limited, but is, for example, a range of 100° C. to 160° C. The wind speed of the hot air is not particularly limited, but is, for example, equal to or lower than 0 m/s super 15 m/s. Although the energy density of the hot air is not as high as that of the laser, the evaporated solvent can be discharged to the outside of the drying furnace 30, so that the drying of the coating film 20 can be promoted.

The energy density of the laser and hot air is calculated as follows.

(Laser energy density) = laser irradiation power (W)/laser irradiation area ($cm^2$) (hot air energy density) = energy required for drying the coating film 20 ($J/cm^2$)/drying time by hot air (s)

Figure 3A:
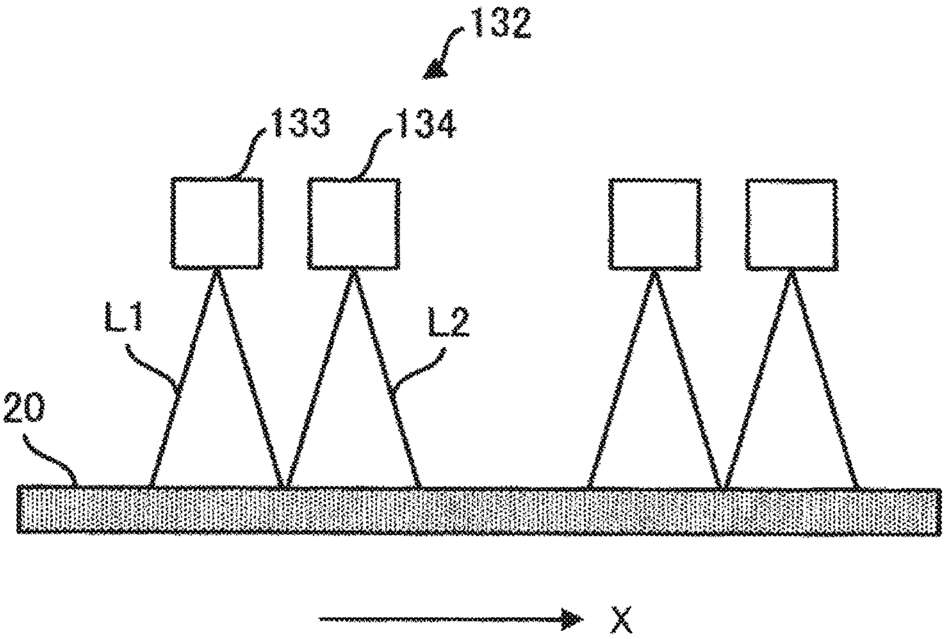
FIG. 3A is a diagram showing a state of irradiating a laser L1, L2 to the coating film 20, a view of the coating film 20 observed from the side.
Figure 3B:
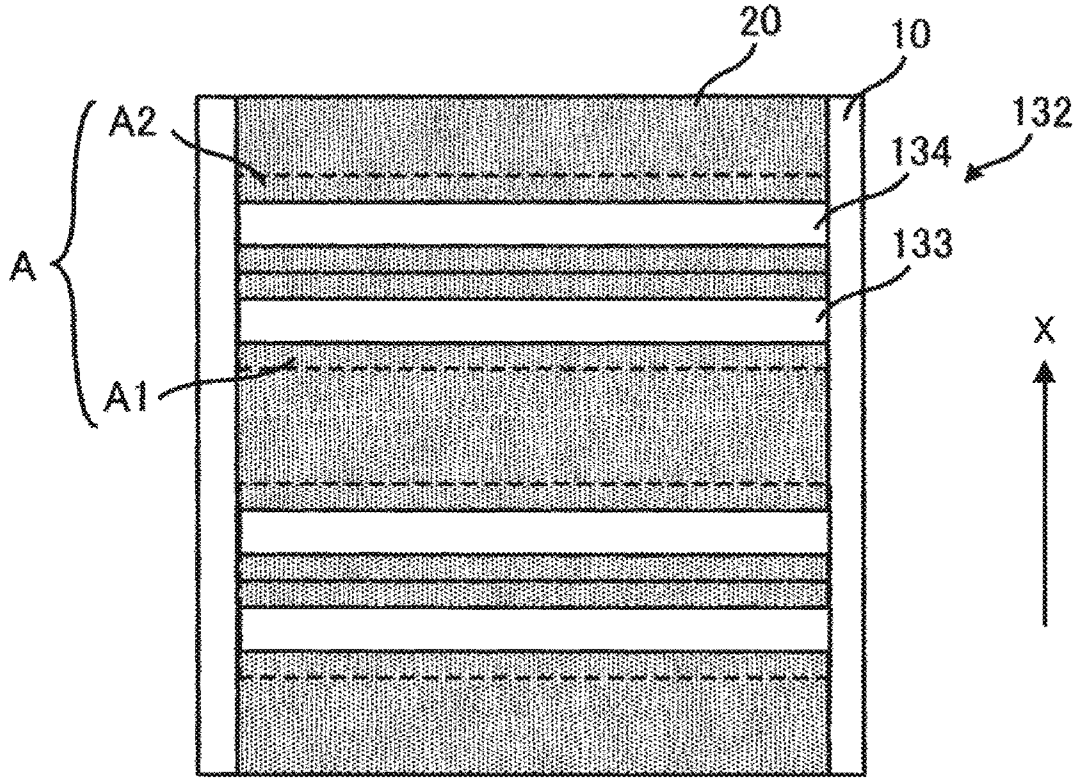
FIG. 3B is a diagram showing a state of irradiating a laser L1, L2 to the coating film 20, a view of the coating film 20 observed from the top surface.

(1) Two types of lasers having different energy densities are used as the heat source. When two types of lasers are used as the heat source, the upstream region A1 is irradiated with laser L1, and the downstream region is irradiated with laser L2. At this time, the energy-density of the respective lasers is set so that E1/E2 falls within a predetermined range. FIG. 3A and FIG. 3B show how the coating film 20 is irradiated with laser L1, L2. FIG. 3A is a side view of the coating film 20, and FIG. 3B is a top view of the coating film 20.

When two types of lasers having different energy-densities are used, a heat source device 132 (shown in FIG. 3A and FIG. 3B) that is an exemplary heat source device 32 may be used. That is, the heat source device 132 includes an upstream laser irradiating unit 133 capable of irradiating the upstream region A1 with laser L1 and a downstream laser irradiating unit 134 capable of irradiating the downstream region A2 with laser L2.

In addition to two lasers having different energy densities, hot air may be used as a heat source. As a result, a large amount of the evaporated solvent can be discharged to the outside of the drying furnace 30, so that drying of the coating film 20 can be promoted. In this case, the heat source device includes a hot air irradiation unit in addition to the upstream side laser irradiation unit and the downstream side laser irradiation unit. In addition, three or more kinds of lasers may be used as the heat source.

Figure 4A:
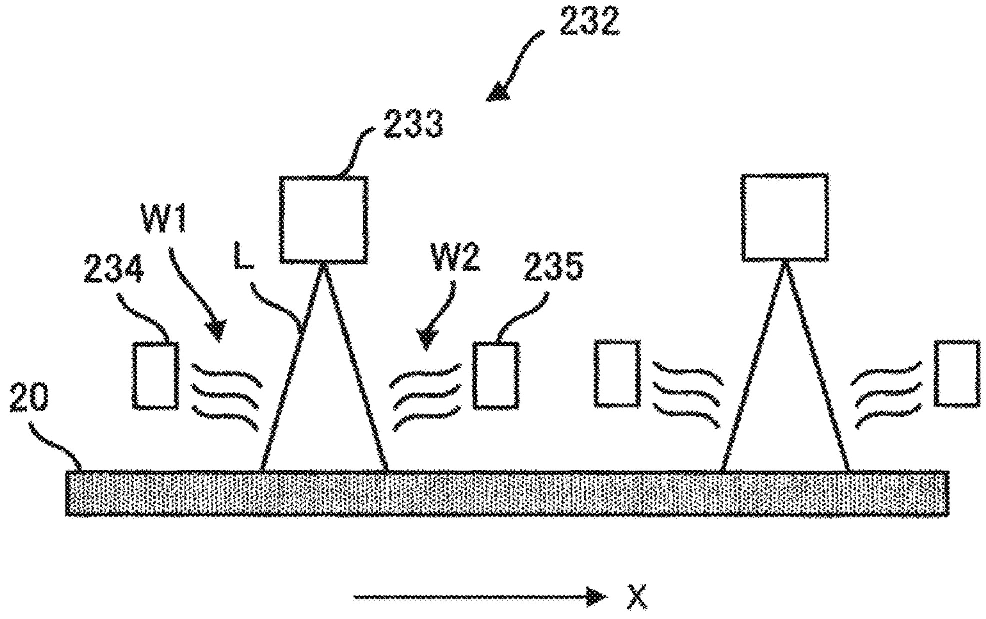
FIG. 4A is a diagram showing a state of irradiating the coating film 20 with a laser L and hot air W1, W2, the coating film 20 is a view observed from the side.
Figure 4B:
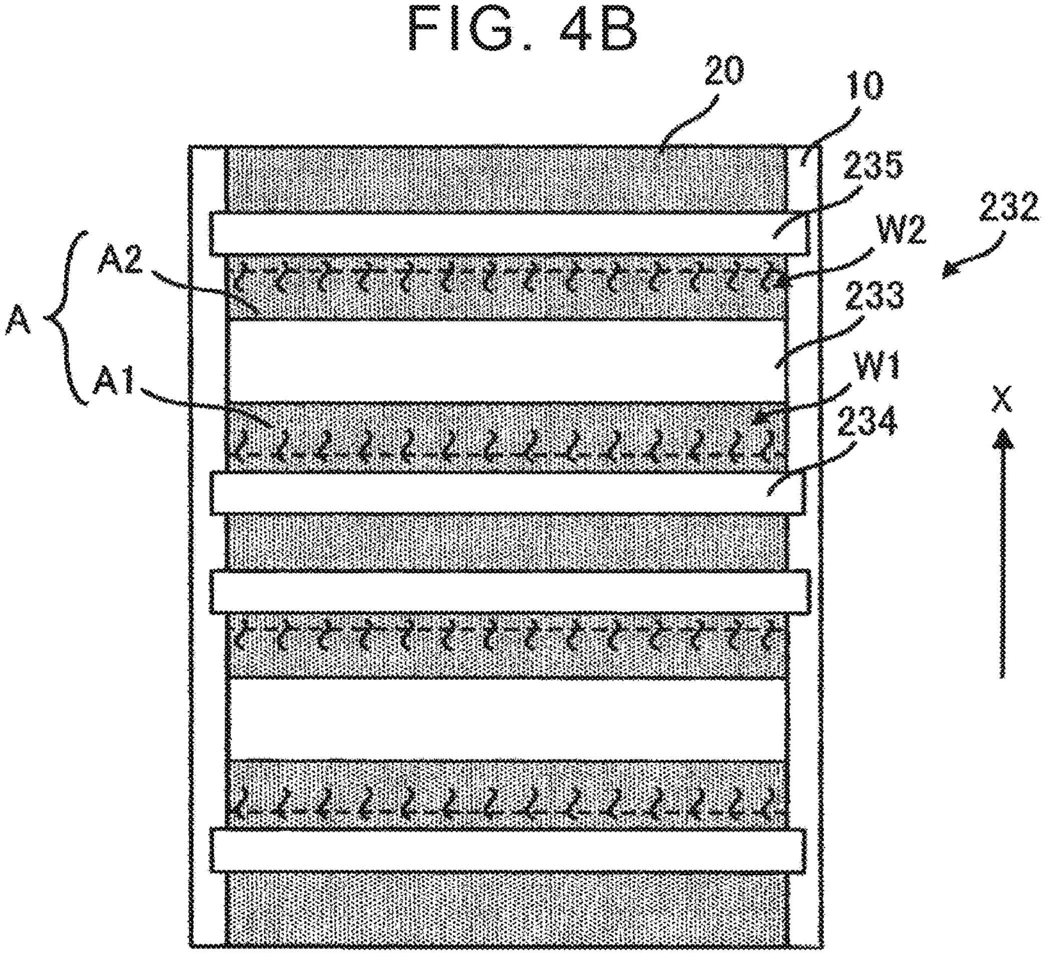
FIG. 4B is a view showing a state in which a coating film 20 is irradiated with a laser L and a hot air W1, W2, and is a view in which a coating film 20 is observed from an upper surface.

(2) A case where a laser and hot air are used as the heat source will be described. When the laser and the hot air are used as the heat source, the upstream hot air W1 is irradiated to the upstream region A1 while the laser L is irradiated to the entire irradiation region A, and the downstream region A2 is irradiated with the downstream hot air W2. Here, the energy density E1 is the sum of the energy density of the laser L and the energy density of the upstream hot air W1, and the energy density E2 is the sum of the energy density of the laser L1 and the energy density of the downstream hot air W2. FIG. 4A and FIG. 4B show how the coating film 20 is irradiated with laser L and hot air W1, W2. FIG. 4A is a side view of the coating film 20, and FIG. 4B is a top view of the coating film 20.

In FIGS. 4A and 4B, the upstream hot air W1 is irradiated toward the downstream side in the transportation direction, and the downstream hot air W2 is irradiated toward the upstream side in the transportation direction. However, the present disclosure is not limited to this embodiment. The upstream hot air W1 may be irradiated toward the upstream side in the transportation direction, and the downstream hot air W2 may be irradiated toward the downstream side in the transportation direction. The upstream hot air W1 and the downstream hot air W2 may be irradiated in different directions as shown in FIG. 4A and FIG. 4B, or may be irradiated in the same direction Here, usually, the wind speed of the upstream hot air W1 may be higher than the wind speed of the downstream hot air W2. As a result, it is possible to accelerate the discharge of the solvent evaporated in the upstream region A1 to the outside of the drying furnace 30, so that the solvent evaporation rate in the upstream region A1 can be increased, and thus the electrode-cracking suppressing effect can be enhanced. The wind speed of the upstream hot air W1 may be, for example, 3 m/s or more and 15 m/s or less. The wind speed of the downstream hot air W2 may be, for example, equal to or less than 0 m/s super 3 m/s.

When a laser and hot air are used as the heat source, a heat source device 232 (shown in FIG. 4A and FIG. 4B) which is an exemplary heat source device 32 may be used. That is, the heat source device 232 includes an irradiation unit 233 capable of irradiating the entire irradiation region A with the laser L, an upstream hot air irradiation unit 234 capable of irradiating the upstream hot air W1 to the upstream region A1, and a downstream hot air irradiation unit 235 capable of irradiating the downstream hot air W2 to the downstream region A2.

As described above, the hot air may include the upstream hot air W1 irradiated to the upstream region A1 and the downstream hot air W2 irradiated to the downstream region A2, but the hot air may be only the upstream hot air W1 irradiated to the upstream region A1 (the wind speed of the downstream hot air W2 is 0). Even in this case, if E1/E2 can be set to a predetermined range, cracking of the electrodes can be suppressed.

The electrode manufacturing method of the present disclosure has been described above with reference to one embodiment. According to the electrode manufacturing method of the present disclosure, peeling of the electrode from the current collector foil can be suppressed.

Battery Manufacturing Method

A battery manufacturing method of the present disclosure will be described using an embodiment.

One embodiment is a battery manufacturing method, comprising: an electrode manufacturing step of obtaining an electrode using the electrode manufacturing method; and a battery manufacturing step of assembling a battery using the obtained electrode. Since the electrode manufacturing step has been described above, the battery manufacturing step will be described below.

The battery manufacturing step is a step of assembling the battery using the electrode obtained in the electrode manufacturing step. Such a battery manufacturing step is known. A typical example in which the electrode obtained in the electrode manufacturing step is a positive electrode will be described below, but the present disclosure is not limited thereto.

When the electrode obtained in the electrode manufacturing step is a positive electrode, a battery is manufactured using a separately manufactured negative electrode and an electrolyte layer.

When the electrolyte is a liquid-based electrolyte, a battery can be manufactured by disposing a separator between the positive electrode and the negative electrode, and then supplying the electrolyte to the separator. The separator is mainly a polyolefin-based porous sheet. The electrolyte solution is obtained by dissolving a supporting salt in a non-aqueous solvent. Examples of the non-aqueous solvent include carbonates, ethers, and esters. Examples of the support salt include $LiPF_6$, $LiBF_4$, lithium bis(fluorosulfonyl)imide (LiFSI), lithium bis(trifluoromethane)sulfonimide (LiTFSI), and the like.

When the electrolyte is a solid electrolyte, a battery can be manufactured by disposing a solid electrolyte layer between the positive electrode and the negative electrode. The solid electrolyte layer includes a solid electrolyte. The solid electrolyte layer may contain a binder. The solid electrolyte and the binder may be appropriately selected from the solid electrolyte and the binder described above.

The battery manufacturing method of the present disclosure has been described above with reference to one embodiment. In the battery manufacturing method of the present disclosure, since the electrode is manufactured based on the above-described electrode manufacturing method, the electrode is suppressed from being peeled from the current collector foil. Therefore, according to the battery manufacturing method of the present disclosure, it is possible to suppress deterioration in battery performance due to peeling of the electrode.

After coating a slurry obtained by dispersing an electrode material in a solvent (water) on a current collector foil to obtain a coating film, a current collector foil having a coating film formed thereon was introduced into a drying furnace, and the coating film was dried. The widthwise length of the coating was adjusted to 1160 mm.

The heat source device of the drying furnace was constructed according to the configuration of FIG. 1, FIG. 4A, and FIG. 4B. That is, a heat source device was used including a laser irradiation unit capable of irradiating the entire irradiation region A with the laser L (energy density: 1.0 W/cm$^2$), an upstream hot air blowing unit capable of blowing the upstream hot air W1 (energy density: 0.38 W/cm$^2$) to the upstream region A1, and a downstream hot air blowing unit capable of blowing the downstream hot air W2 (energy density: 0.05 W/cm$^2$) to the downstream region A2. The irradiation region A was set to a width-direction length 1160 mm and a transportation-direction length 900 mm. The upstream hot air W1 was set at 120° C. and the wind speed 15 m/s. The downstream hot air W2 was set at 120° C. and the wind speed 2 m/s. The energy density E1 (E1/E2) of the heat source irradiated on the upstream region A1 relative to the energy density E2 of the heat source irradiated on the downstream region A2 is 1.31.

Figure 5:
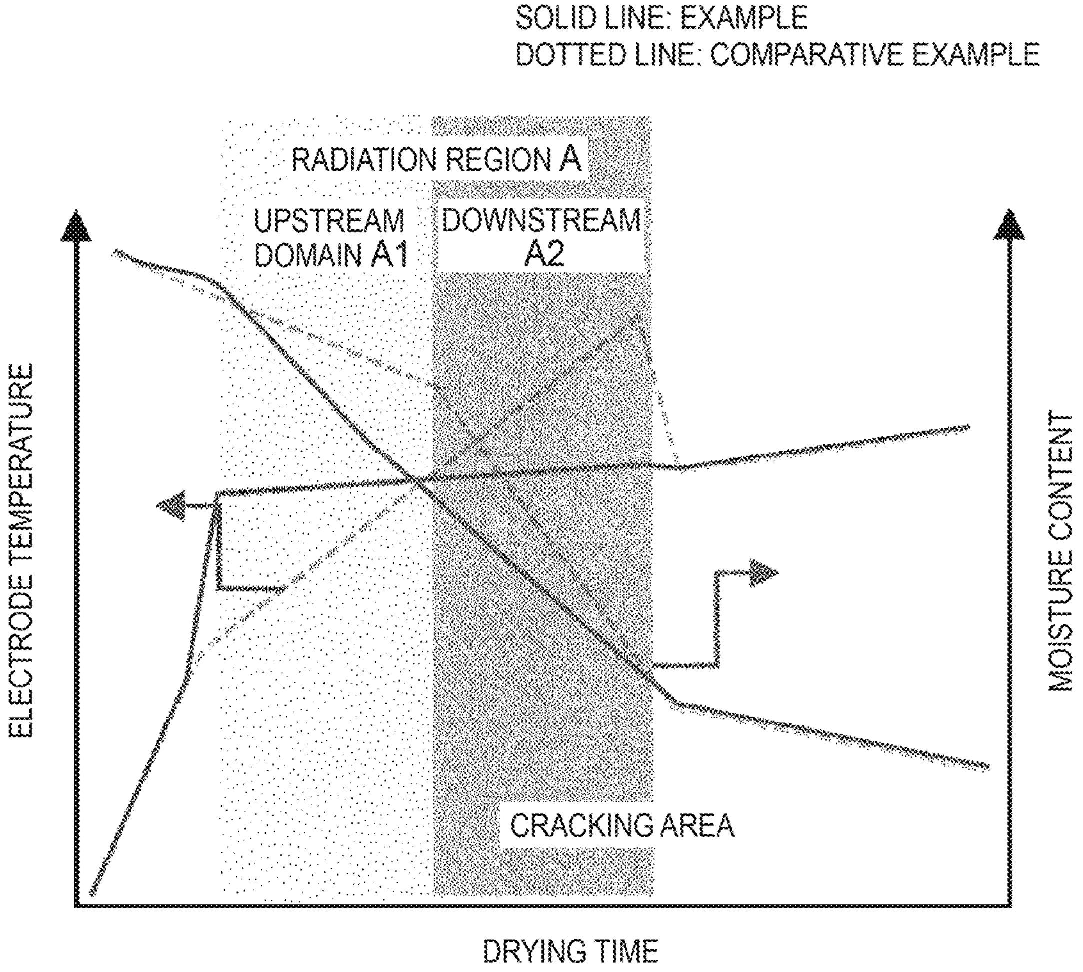
FIG. 5 is a diagram illustrating results of an embodiment.

The results are shown in FIG. 5. The electrode temperature (coating film temperature) is a value obtained by measuring the electrode surface using a radiation thermometer. Moisture fraction, the amount of mass reduction obtained by sequentially observing the amount of mass reduction while drying in a state in which the electrode is placed on the balance as the amount of water reduction, calculated from the amount of water reduction. The comparative example is an example in which constant irradiation with a heat source having an energy density of 1.5 W/cm$^2$ was performed.

As shown in FIG. 5, in the comparative example, the electrode temperature increased at a constant speed in the irradiation region A, the rate of decrease in the water content was gentle in the upstream region A1, and was steep in the downstream region A2. For this reason, in the comparative example, there is a possibility that cracks occur in the electrodes in the downstream-region A2.

On the other hand, in the example, the electrode temperature (coating film temperature) was substantially constant in the irradiation region A, and the rate of decrease of the moisture content was also substantially constant. When the examples and the comparative examples are compared, the rate of decrease in the water fraction in the upstream region A1 is faster in the example, and the rate of decrease in the water fraction in the downstream region A2 is slower in the example. As described above, in the embodiment, by adjusting E1/E2 using the laser and the hot air as the heat source, the temperature of the electrodes and the evaporation rate of the solvents can be adjusted. Thus, cracking of the electrode can be suppressed.

What is claimed is:

1. An electrode manufacturing method comprising:

an application step for applying, onto a current collector foil, a slurry obtained by dispersing an electrode material in a solvent to obtain a coating film; and a drying step for drying the coating film while transporting the current collector foil with the coating film in a drying furnace, wherein:

in the drying step, the coating film is irradiated with a heat source at least once; and assuming that an irradiation range of the heat source that irradiates the coating film includes two regions divided by a straight line bisecting a length of the irradiation range in a transport direction, the region located on an upstream side in the transport direction is an upstream region, and the region located on a downstream side in the transport direction is a downstream region, a ratio of an energy density of the heat source that irradiates the upstream region to an energy density of the heat source that irradiates the downstream region is 1.2 or more and 3.0 or less.

2. The electrode manufacturing method according to claim 1, wherein in the drying step, the heat source is a laser and hot air.

3. The electrode manufacturing method according to claim 2, wherein:

the hot air includes upstream hot air that is blown to the upstream region and downstream hot air that is blown to the downstream region; and an air velocity of the upstream hot air is higher than an air velocity of the downstream hot air.

4. A battery manufacturing method comprising:

an electrode manufacturing step for manufacturing an electrode by the electrode manufacturing method according to claim 1; and a battery manufacturing step for assembling a battery by using the electrode.

* * * * *